US011875709B2

(12) United States Patent
Dürnberger

(10) Patent No.: US 11,875,709 B2
(45) Date of Patent: Jan. 16, 2024

(54) SAMPLE FOLDER

(71) Applicant: KAINDL MARKEN GmbH, Wals (AT)

(72) Inventor: Gerhard Dürnberger, Strasswalchen (AT)

(73) Assignee: KAINDL MARKEN GMBH, Wals (AT)

( * ) Notice: Subject to any disclaimer, the term of this patent is extended or adjusted under 35 U.S.C. 154(b) by 0 days.

(21) Appl. No.: 17/638,373

(22) PCT Filed: Aug. 30, 2019

(86) PCT No.: PCT/EP2019/073220

§ 371 (c)(1),
(2) Date: Feb. 25, 2022

(87) PCT Pub. No.: WO2021/037377

PCT Pub. Date: Mar. 4, 2021

(65) Prior Publication Data

US 2022/0327967 A1 Oct. 13, 2022

(51) Int. Cl.
*G09F 5/04* (2006.01)

(52) U.S. Cl.
CPC ...................................... *G09F 5/04* (2013.01)

(58) Field of Classification Search
CPC ..... G09F 5/04; G09F 2005/045; B42D 1/001; B42D 3/12; B42F 3/00; B42F 13/0033; A47F 7/163
USPC ................ 281/16, 19.1; 402/14, 17; 462/57; 206/472, 473
See application file for complete search history.

(56) References Cited

U.S. PATENT DOCUMENTS

| | | | | | |
|---|---|---|---|---|---|
| 323,729 | A * | 8/1885 | Pershing | B42D 1/001 | 281/16 |
| 370,349 | A * | 9/1887 | Pershing | B42D 1/001 | 281/16 |
| 803,360 | A * | 10/1905 | Price | B42D 15/00 | 281/39 |
| 1,582,458 | A * | 4/1926 | Fortney | B42D 3/12 | 281/16 |
| 2,005,717 | A * | 6/1935 | Coulston | B42F 13/0033 | 402/75 |

(Continued)

FOREIGN PATENT DOCUMENTS

| | | |
|---|---|---|
| DE | 1041785 | 10/1958 |
| EP | 0329561 | 8/1989 |

(Continued)

OTHER PUBLICATIONS

International Search Report and Written Opinion of PCT/EP2019/073220 dated Apr. 23, 2020, 15 pages (English translation of International Search Report).

*Primary Examiner* — Cassandra Davis
(74) *Attorney, Agent, or Firm* — RANKIN, HILL & CLARK LLP

(57) ABSTRACT

Sample folder (10) comprising a first pack (12), a second pack (14), the first pack (12) and the second pack (14) being designed as separate units, and the first pack (12) having a housing (16) with which the second pack (14) can be connected in a basic position in such a way that the second pack (14) is at least partially surrounded by the housing (16) of the first pack (12) and is detachably held thereby.

16 Claims, 7 Drawing Sheets

(56) References Cited

U.S. PATENT DOCUMENTS

| | | | | | |
|---|---|---|---|---|---|
| 2,272,086 | A * | 2/1942 | Harris | B42D 13/00 281/16 |
| 5,174,674 | A | 12/1992 | Norwood | |
| 7,744,128 | B2 * | 6/2010 | El-Sorrogy | B42F 13/38 281/4 |
| 2005/0155943 | A1 * | 7/2005 | Butcher | A47F 7/163 211/45 |
| 2012/0189797 | A1 * | 7/2012 | Moriba | G09F 5/04 428/42.1 |

FOREIGN PATENT DOCUMENTS

| | | | |
|---|---|---|---|
| KR | 20150004287 | U * | 1/2013 |
| KR | 20130000757 | U * | 12/2015 |

* cited by examiner

SAMPLE FOLDER

The present invention relates to a sample folder for clearly displaying a plurality of sample elements, in particular surface decorations.

Such sample folders are known in particular for presenting a customer with a plurality of different samples in a clear manner, so that the customer can obtain an overview of the different products offered by a company.

It often happens that a customer would like to view a plurality of first samples in a direct comparison, that is to say spatially close to one another, with a plurality of second samples. Examples of this can be a comparison of the exterior colour of a vehicle with the interior colour of a vehicle or a comparison of the decoration of a work surface with a surface of adjacent cabinet elements.

Therefore, a first sample folder which comprises a first number of sample elements, and a second sample folder, which comprises a second number of sample elements, are usually handled separately from one another by a user and, if applicable, transported to the customer. In order to prevent the sample folders from being opened unintentionally, the sample folders can have tabs or flaps by means of which the sample folders can be closed.

Handling two separate sample folders can be cumbersome for a user and confusing for a customer looking at the sample folders. Furthermore, it happens again and again that one of two sample folders forming a pair is lost, or that a sample folder of a first pair is mixed up with a sample folder of a second pair, so that the desired sample combinations cannot be presented to a customer, in particular if the sample folders which belong together are stored separately.

Therefore the object of the present invention is to provide a sample folder which offers improved handling for users and customers.

This object is achieved according to the invention by a sample folder for the clear representation of a plurality of sample elements, in particular surface decorations, comprising

- a first pack of sample elements, wherein at least some of the sample elements of the first pack are displaceable relative to other sample elements of the first pack,
- a second pack of sample elements, wherein at least some of the sample elements of the second pack are displaceable relative to other sample elements of the second pack,
- wherein the first pack and the second pack are designed as units which are separate from one another, and
- wherein the first pack has a housing to which the second pack can be connected in a basic position in such a way that the second pack is at least partially surrounded by the housing of the first pack and is releasably held thereby.

The expression "units which are separate from one another" is intended to mean that the first pack and the second pack form two unconnected parts in a state detached from one another. Nevertheless, it is conceivable that the two packs can be connected via a flexible connection such as a strap or a chain, for example.

The second pack can thus be arranged in the housing of the first pack and can be connected thereto, so that transport is facilitated for a user, since only one housing comprising two packs has to be handled. When the sample folder according to the invention is stored, it is also possible to prevent second packs of the sample folder from becoming detached from the first packs and/or being mixed up with other second packs. The sample folder can be designed in such a way that no additional closure elements, such as tabs or flaps, are necessary to secure the second pack to the first pack and/or the respective sample elements.

The basic position can be achieved both in a first orientation of the second pack relative to the first pack and at least one second orientation, which is in mirror image relative to the first orientation, as long as a relative positioning/distancing of the second pack relative to the first pack or to the housing of the first pack remains the same.

The first pack can be completely or partially open on at least one side, in particular on three sides. In particular, the side of the housing of the first pack, beyond which the sample elements of the first pack can be displaced relative to the housing of the first pack, is open.

The sample folder can hold the sample elements pivotably about a pivot axis which is arranged, for example, at a position adjacent to the open side. However, the term "sample folder" in the context of the present invention should not be understood as being strictly limited to a folder-like, in particular pivotable, arrangement of the sample elements, since sample elements of a sample folder according to the invention can also, for example, be "leafed through" as in a book or can be moved translationally.

In a further development of the present invention, each of the first pack and the second pack can comprise at least one magnetic or magnetisable portion, wherein the first pack and the second pack can be releasably connected to one another via an interaction of a magnetic or magnetisable portion of the first pack with a magnetic or magnetisable portion of the second pack. Thus, the basic position and possibly further positions of the first pack relative to the second pack can be fixed in a repeatable manner via the magnetic or magnetisable portions.

The magnetic or magnetisable portions can be designed and arranged in such a way that the interaction thereof secures the first pack relative to the second pack in all three translational degrees of freedom. This means that a round magnet or magnetisable portion of one pack, for example, can secure a magnet or magnetisable portion of the other pack which interacts with it and is, for example, likewise round, in such a way that the two magnets or magnetisable portions can be prevented from both moving away from one another and also sliding translationally against one another. Of course, this securing is dependent on the magnitude of the acting magnetic forces. A substantially round design of a magnet or magnetisable portion can allow rotation thereof.

In particular in the basic position the second pack can be accommodated substantially completely within a casing of the first pack. A "casing" is to be understood here as an imaginary simple geometric volume shape, such as a cuboid or a sphere, for example, which encases the first pack or the housing of the first pack as closely as possible. In order to secure the second pack in the casing of the first pack, an interaction of magnets or magnetisable portions of the two packs can be used. Alternatively or additionally, of course, other securing means are also conceivable, such as an interaction of projections and recesses.

Furthermore, the first pack, in particular the housing of the first pack, can have a stop against which the second pack rests in the basic position. This can prevent the second pack from being displaced beyond the basic position. Thus, for example, damage to the sample elements of the first and/or the second pack can be prevented.

For this purpose, the stop can be formed by a reinforcement of some portions, in particular a reinforcement of at least one side wall, of the housing of the first pack. This means that the stop can be formed by a transition between an unreinforced portion of the housing and a reinforced portion of the housing. For this purpose, a reinforcement of side walls can be designed substantially completely with the exception of the size of the second pack or the housing thereof, so that the second pack or the housing of the second pack protrudes completely into the casing of the first pack. A thickness of the reinforcement attached to at least an inner side of side walls of the housing of the first pack, for example, may be substantially equal to a thickness of a side wall of the housing of the second pack. In this way, an exterior of the sample folder which appears symmetrical can be achieved, since the total thickness of a side wall of the housing of the first pack plus a reinforcement provided there (e.g. on one side of the sample folder) can have substantially the same thickness as a total thickness of an unreinforced side wall of the housing of the first pack plus a side wall of the housing of the second pack (e.g. on one side of the sample folder).

The sample elements of the first pack can be arranged on at least one sample carrier, wherein the sample carrier can be displaceable, in particular pivotable, relative to the housing of the first pack. The sample carriers can comprise gripping surfaces in order to improve the handling of the sample carriers.

The sample elements can be arranged on sample carriers which have different dimensions from one another.

Advantageously, at least one of the sample elements and/or the at least one sample carrier can have at least one rounded or bevelled corner. In particular, the corners of the sample element or of the sample carrier which face the second pack located in the basic position can be rounded or bevelled, or the corner of the sample element or of the sample carrier which also extends out of its casing during a displacement of the sample elements of the first pack can be rounded or bevelled. In this way the second pack, in particular a side wall of the housing of the second pack, can be prevented from coming into contact with the sample elements or the sample carriers of the first pack and damaging them. At least one of the sample elements and/or sample carriers can be designed as substantially rectangular plates, for example.

Advantageously, in the basic position, the second pack can be set up to prevent the sample elements of the first pack from being displaced out of a casing of the first pack. Thus, additional securing devices to secure the sample elements of the first pack can be superfluous and can be omitted since the second pack, in particular the housing of the second pack, secures the sample elements or the sample carriers in the casing of the housing of the first pack in the basic position. In the case of the rounded or bevelled corners of the sample elements or of the sample carriers, the corners can be designed in such a way that when a force is applied which forces the sample elements or the sample carriers to move out of the casing of the first pack, the rounded or flattened corners come into contact with the second pack, in particular with the housing thereof, as flush as possible, i.e. not with a protruding or angular portion. As a result, damage to the sample elements or the sample carriers can also be prevented when the sample folder is being transported.

In the basic position, the second pack can be arranged in such a way that each sample element which can be displaced relative to the housing of the first pack and/or each sample carrier protrudes into a casing of the second pack. The casing of the second pack can be decisively defined by the housing of the second pack, wherein open sides of the housing of the second pack on which no side wall is arranged, for example, are closed by a straight extension of the imaginary casing. For this purpose, at least on the side on which the sample elements or the sample carriers of the first pack protrude into the casing of the second pack, sample elements or sample carriers which are arranged in the housing of the second pack can be arranged offset inwards relative to the casing of the second pack by at least the distance by which the sample elements or the sample carriers of the first pack protrude into the casing of the second pack. Preferably, this offset of the sample elements or of the sample carriers of the second pack can also be provided on an opposing side so that, in a first orientation as well as in a second orientation rotated by 180° relative to the first orientation, the second pack can be arranged on the first pack in the basic position. On other open sides of the housing of the second pack, sample elements or sample carriers arranged therein, i.e. the end faces thereof which face outwards, can be arranged substantially flush with the casing of the second pack.

Furthermore, the first pack can also be detachably connected to the second pack in a release position, in which the second pack is positioned differently relative to the first pack by comparison with the basic position in which the second pack can be set up and arranged to allow a displacement of the sample elements of the first pack relative to the housing of the first pack. Advantageously, the release position can be arranged relative to the basic position in such a way that the second pack is only displaced translationally by a predetermined distance from the basic position relative to the first pack, in particular in a direction in which the second pack only leaves, i.e. comes out of, the casing of the first pack on one side of the casing of the first pack. This applies in particular in the event that the casing of the first pack has a cuboid shape.

The first pack can also be releasably connected to the second pack in a presentation position in which the second pack is oriented, in particular also positioned, differently relative to the first pack compared to the basic position and oriented, in particular also positioned, differently compared to the release position in which the second pack can be set up and arranged to allow displacement of sample elements of the second pack relative to other sample elements of the second pack, in particular relative to the housing of the first pack. To summarise, the various relative positions can be designed in such a way that in the basic position a displacement of both the sample elements of the first pack and also the sample elements of the second pack is prevented, that in the release position a displacement of the sample elements of the first pack is allowed and a displacement of the sample elements of the second pack is prevented, and that in the presentation position a displacement of both the sample elements of the first pack and also the sample elements of the second container is allowed. It should be noted here that "displacement" should be understood to mean a clear emergence of the sample elements from an associated casing, so that the sample represented by the sample elements can be easily recognised by a user of the sample folder.

In particular, the release position and the presentation position can differ by an orientation of the second pack in the specific position relative to the first pack, but are substantially the same when the second pack is positioned in the associated position relative to the first pack. Thus the second pack can assume substantially the same position relative to the first pack or the second pack can protrude from the casing of the first pack by substantially the same distance, but in the presentation position the second pack can be arranged rotated, for example, by 180° relative to the orientation in the release position. Thus in the release position the housing of the second pack, which has for example three side walls, can be arranged in such a way that a side wall of the housing of the second pack faces an open side of the housing of the first pack, and in the presentation position it can be arranged in such a way that an open side of the housing of the second pack faces an open side of the housing of the first pack, so that sample elements of the second pack can be displaced out of the casing of the first pack while the housing of the second pack is arranged at least partially within the casing of the first pack.

In the basic position, the second pack can be set up and arranged such that displacement of the sample elements of the second pack relative to the housing of the first pack is prevented. This can be achieved in particular in that on an open side of the housing of the second pack, which in the basic position of the second pack on the first pack faces a side wall of the housing of the first pack, the sample elements of the second pack are arranged substantially flush with the casing of the second pack, so that the sample elements of the second pack in the basic position of the second pack on the first pack lie substantially flush against an inner surface of a side wall of the housing of the first pack.

It should be added that the first pack and the second pack may comprise at least one separate pair of co-operating magnetic or magnetisable portions for each predetermined orientation and position in which the second pack is set up to be releasably connected and held on the first pack, or that pairs of magnetic or magnetisable portions of the two packs can be set up to be usable for more than one predefined position of the second pack on the first pack. It is also conceivable that, in a first predetermined holding position of the second pack on the first pack, a first magnetic or magnetisable portion of one pack interacts with a first magnetic or magnetisable portion of the other pack, and, in a second predetermined holding position, interacts with a second magnetic or magnetisable portion of the other pack.

The present invention will be described in greater detail below in relation to an embodiment making reference to the accompanying drawings. In the drawings.

Figure 1:
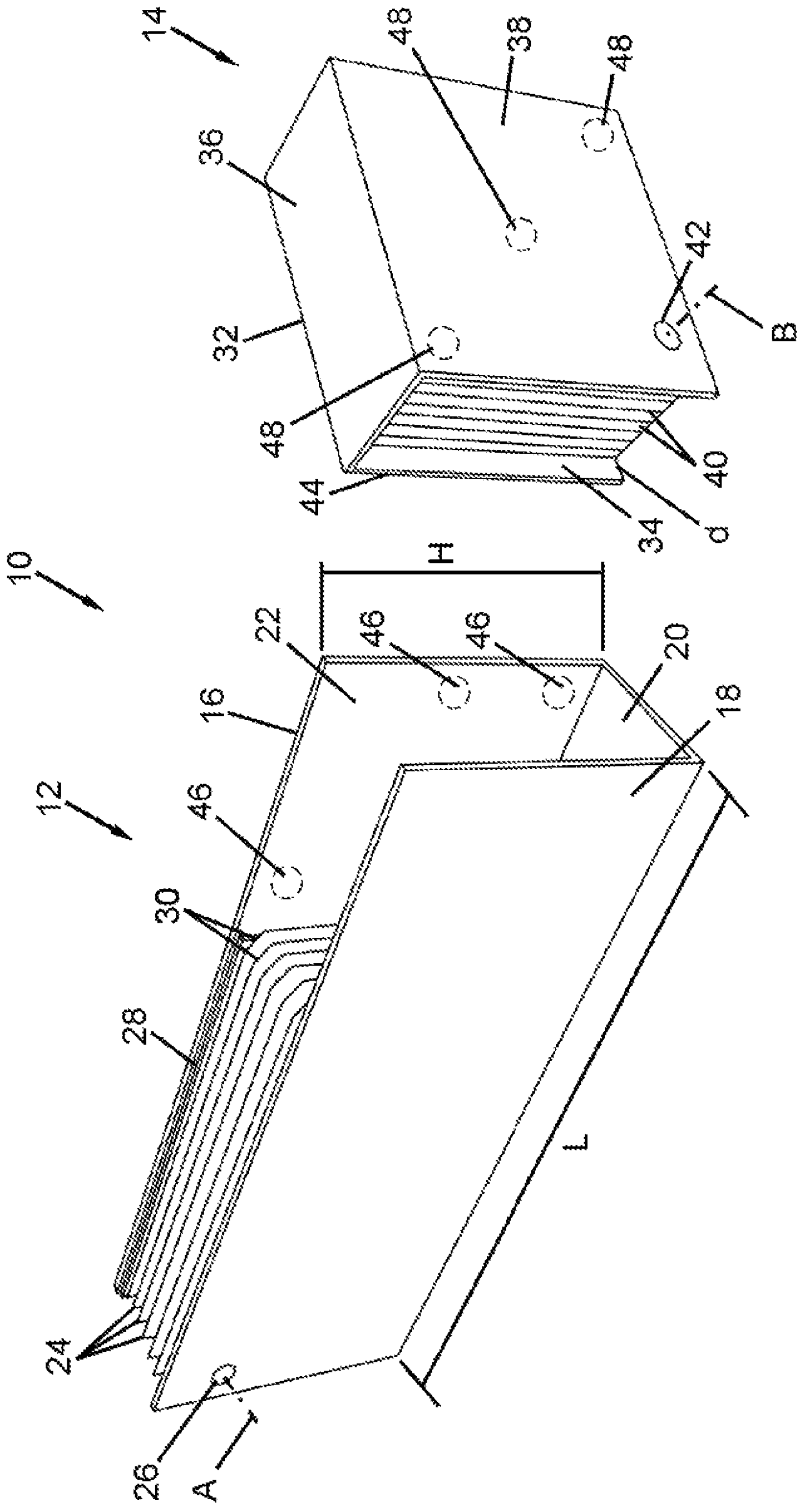
FIG. 1 is a schematic perspective view of the sample folder according to the invention with the first pack and the second pack in a position detached from one another.

In FIG. 1, a sample folder according to the invention is designated generally by the reference sign 10. The sample folder 10 comprises a first pack 12 and a second pack 14. The first pack 12 has a housing 16 which comprises three side walls 18, 20 and 22. A plurality of sample elements 24 or sample carriers 24 to which sample elements are attached are arranged in the housing 16. The sample elements 24 can be pivoted about a pivot axis A relative to the housing 16 of the first pack 12, wherein the pivot axis A is defined by a bolt 26 which extends from the side wall 18 of the housing 16 to the side wall 22 of the housing 16 and is fastened there.

It can also be seen in FIG. 1 that a portion of the side wall 22 of the housing 16 is provided with a reinforcement 28 which extends only in portions over substantially the entire height H of the housing 16 of the first pack 12 and over a length L of the housing 16 of the first pack 12. The reinforcement 28 is arranged flush with the longitudinal end of the housing 16 associated with the pivot axis A.

The sample elements 24 also have bevelled corners 30 which are described further below.

The second pack 14 has a housing 32 which comprises three side walls 34, 36 and 38. A plurality of sample elements 40 or sample carriers 40 to which sample elements are attached are arranged in the housing 32 of the second pack 14. The sample elements 40 can be pivoted about a pivot axis B relative to the housing 32 of the second pack 14, wherein the pivot axis B is defined by a bolt 42 which extends from the side wall 34 of the housing 32 to the side wall 38 of the housing 32 and is fastened there.

It can be seen that end faces of the sample elements 40 are arranged offset backwards by a predetermined distance d relative to an edge 44 of the housing 32 of the second pack 14, which edge is shown on the left in FIG. 1, is defined by the side walls 34, 36, 38 and is arranged adjacent to the pivot axis B.

By way of example, magnetic or magnetisable portions 46 are shown (as dashed circles) in the side wall 22 of the housing 16 of the first pack 12 and, for example, can be incorporated into the side wall 22 and thus arranged in a concealed manner. The magnetic or magnetisable portions 31 of the first pack 12 are designed to interact magnetically with corresponding magnetic or magnetisable portions 48 of the second pack 14 in order to secure the second pack 14 on the first pack 12 in a predetermined position. At this point it should be pointed out that, in the embodiment shown in the figures, the magnetic or magnetisable portions 46 of the first pack 12 shown in FIG. 1 interact with magnetic or magnetisable portions of the second pack 14 (not shown) arranged in opposite directions relative to the magnetic or magnetisable portions 48 of the second pack 14 in order to assume a basic position shown in FIG. 2. The same applies to the magnetic or magnetisable portions 48 of the second pack 14 which, in the basic position shown in FIG. 2, interact with magnetic or magnetisable portions (not shown) arranged in the side wall 18 of the housing 16 of the first pack 12.

Figure 2:
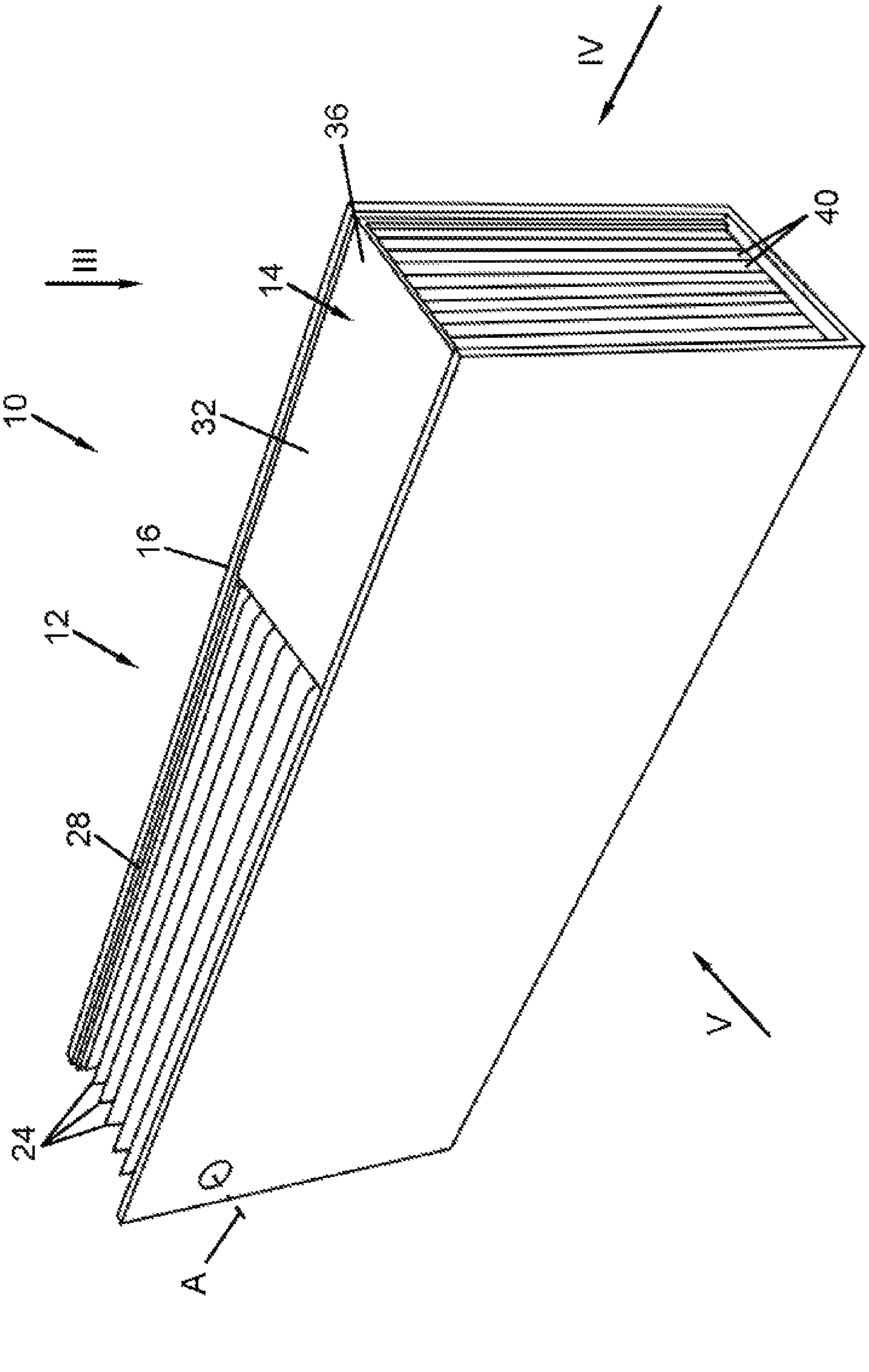
FIG. 2 is a schematic perspective view of the sample folder according to the invention with the first pack and the second pack in a basic position.

In FIG. 2, the second pack 14 is shown in a position connected to the first pack 12 in the basic position. The second pack 14 is accommodated completely within a casing U1 of the first pack 12 (see FIGS. 3 to 5), wherein corresponding magnetic or magnetisable portions of the two packs 12, 14 interact with one another as described above.

In the basic position the edge 44 of the housing 32 of the second pack 14 abuts the reinforcement 28 of the housing 16 of the first pack 12, and preferably further reinforcements of the side walls 20, 18 of the housing 16 of the first pack 12 (described further below). The housing 32 of the second pack 14 overlaps the bevelled corners 30 of the sample elements 24 of the first pack 12 in such a way that the sample elements 24 are prevented from being displaced about the pivot axis A.

As can also be seen in FIG. 2, in the basic position of the second pack 14 on the first pack 12, the sample elements 40 of the second pack 14 abut an inner surface of the side wall 20 of the housing 16 of the first pack 12, so that displacement of the sample elements 40 of the second pack 12 is prevented in the basic position. In the basic position shown in FIG. 2, the side wall 36 of the housing 32 of the second pack 14 or the outer surface thereof is flush with the free ends of the side walls 18 and 22 of the housing 16 of the first pack 12 in the vertical direction H.

Figure 3:
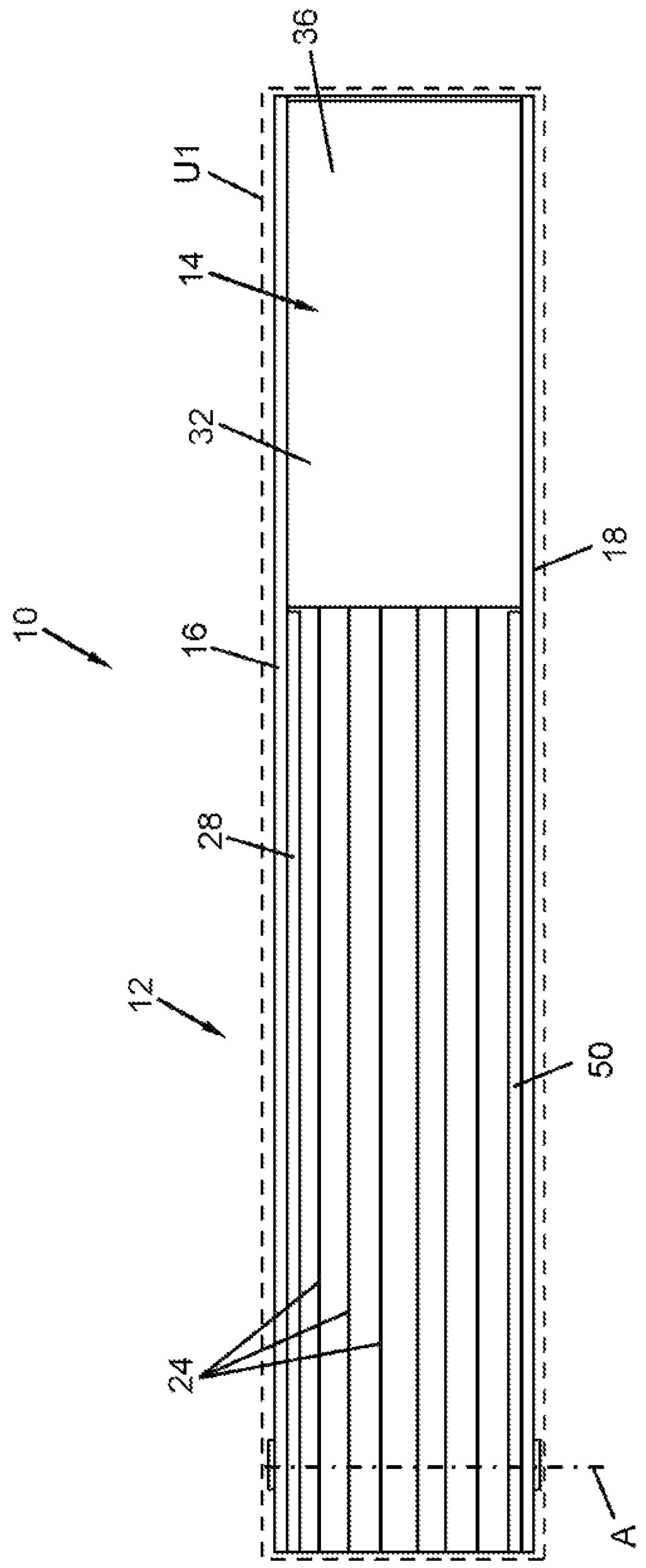
FIG. 3 is a side view of the sample folder according to the invention with the first pack and the second pack in the basic position in the direction of the arrow III from FIG. 2.

FIG. 3 shows a side view according to arrow III from FIG. 2, wherein, firstly, it can be seen that the sample elements 24 of the first pack 12 are overlapped by the side wall 36 of the housing 32 of the second pack 14. Furthermore, FIG. 3 shows a further reinforcement 50 mentioned above, which is assigned to the side wall 18 of the housing 16 of the first pack 12.

Figure 4:
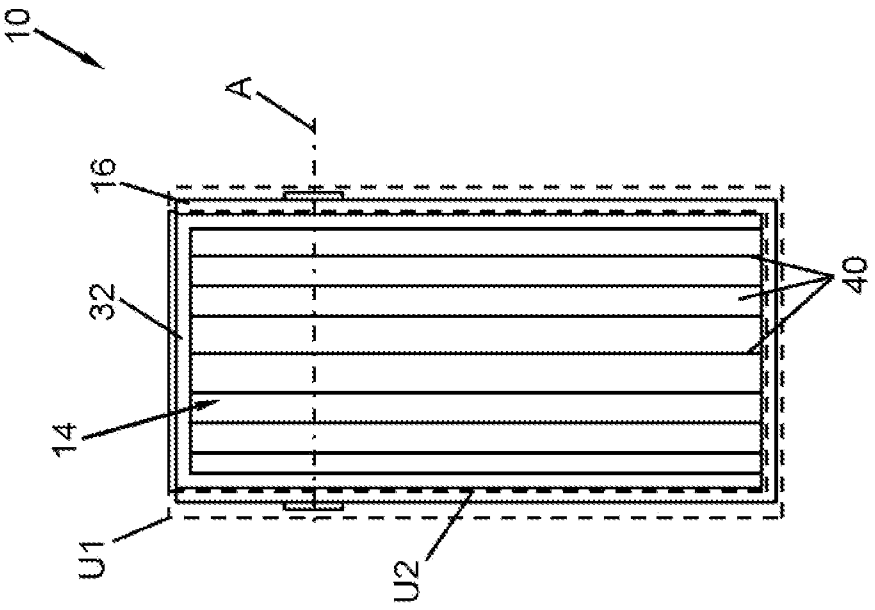
FIG. 4 is a side view of the sample folder according to the invention with the first pack and the second pack in the basic position in the direction of the arrow IV from FIG. 2.
Figure 5:
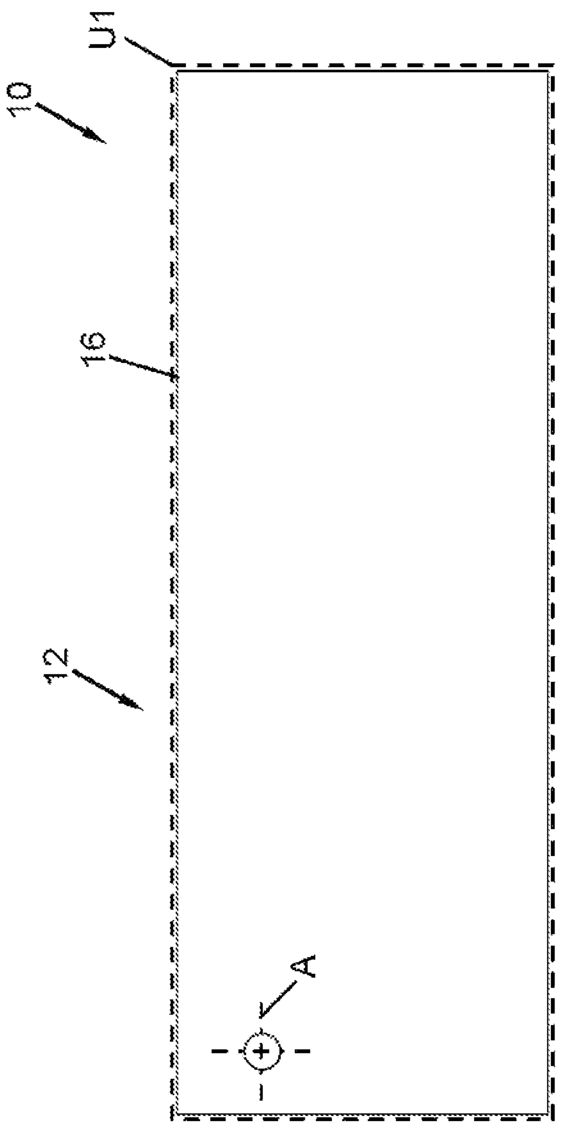
FIG. 5 is a side view of the sample folder according to the invention with the first pack and the second pack in the basic position in the direction of the arrow V from FIG. 2.

In FIGS. 3 to 5, the casing U1 of the first pack 12, shown by broken lines, surrounds the housing 16 of the first pack 12 externally with a tight fit as an imaginary cuboid shape. In FIG. 4, which is a side view of the sample folder 10 according to the arrow IV from FIG. 2, a casing U2 of the second pack 14 is also shown in a side view. The casing U2 likewise surrounds the second pack 14 as an imaginary cuboid shape in a manner analogous to the casing U1 of the first pack 12. FIG. 5, which is a side view of the sample folder 10 according to the arrow V from FIG. 2, shows the aforementioned casing U1 for further clarity.

Figure 6:
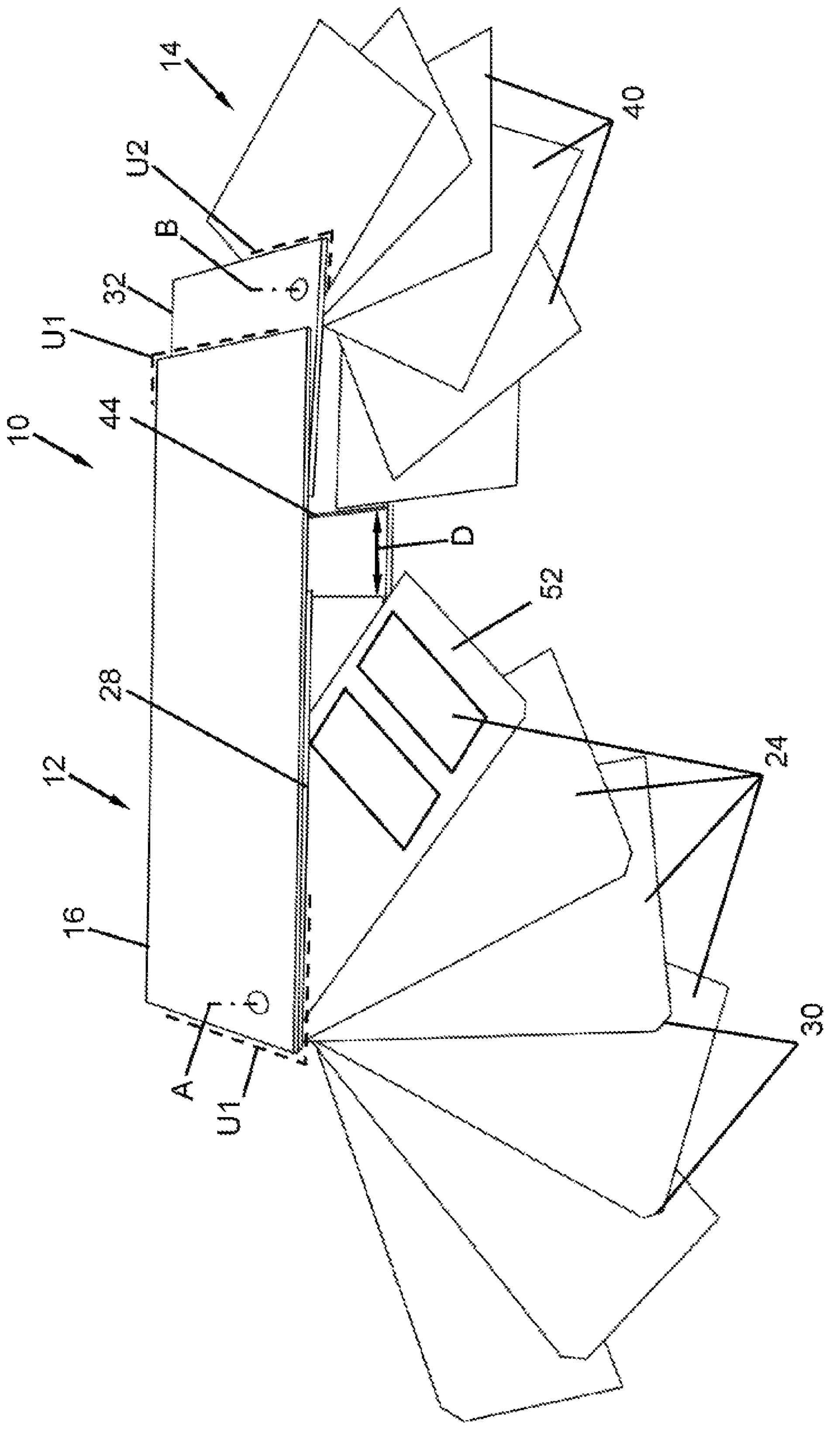
FIG. 6 is a schematic perspective view of the sample folder according to the invention with the first pack and the second pack in a presentation position, wherein sample elements of the two packs are fanned out.

FIG. 6 shows the sample folder 10 in a presentation position. The second pack 14 is rotated on the first pack 12 by 180° relative to the basic position from FIG. 2 in such a way that the side surface 36 of the housing 32 of the second pack 14 abuts the side surface 20 of the housing 16 of the first pack 12. An open side of the housing 32 of the second pack 14 faces an open side of the housing 16 of the first pack 12 so that the sample elements 40 of the second pack 14 can be freely displaced out of the casing U2 (only partially shown in FIG. 6), in this case rotated about the pivot axis B. Furthermore, the second pack 14 is positioned such that it is displaced out of the casing U1 (only partially shown in FIG. 6) of the first pack 12 in FIG. 6 on a right-hand side, so that the housing 32 or the edge 44 of the housing 32 is arranged offset by a distance D relative to an end of the reinforcement 28 of the housing 16 of the first pack 12 facing towards the second pack 14. This also enables a free displacement of the sample elements 24 about the pivot axis A out of the casing U1 of the first pack 12. Advantageously, the sample elements 24 and 40 have respective decorations, at least on their upper sides shown in FIG. 6, in order to be able to present them to a user in a simple manner.

By way of example it is also shown that a plurality of sample elements 24 can also be arranged on a sample carrier 52, wherein the sample carrier 52 is arranged displaceably about the pivot axis A relative to the housing 16 of the first pack 12, analogously to the sample elements 24 described above.

FIG. 6 also shows that in this embodiment only those corners 30 of the sample elements 24 of the first pack 12 are bevelled which, in the basic position, i.e. in the case of sample elements 24 arranged within the casing U1 of the first pack 12, on the one hand face the open side of the housing 16 of the first pack 12 and on the other hand face the second pack 14.

Figure 7:
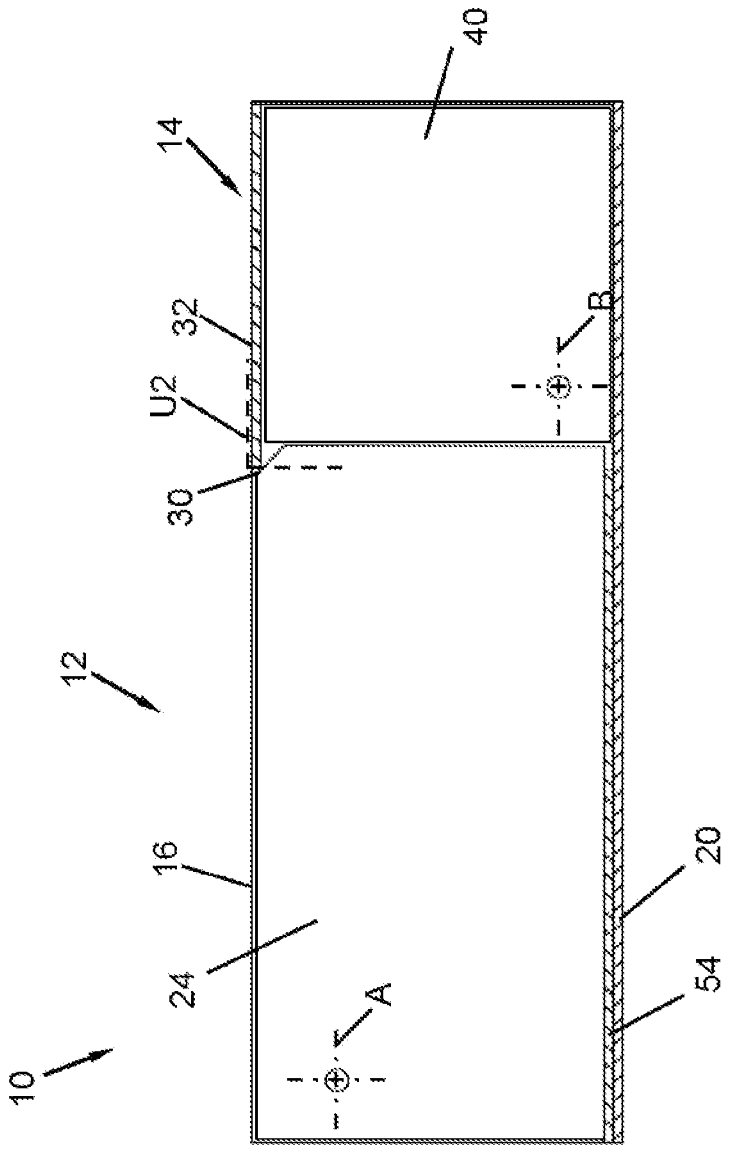
FIG. 7 is a side cross-sectional view of the sample folder from FIG. 2 in the basic position.

FIG. 7 shows a side cross-sectional view of the sample folder according to the invention, wherein the second pack 14 is located in the basic position relative to the first pack 12. It can be clearly seen in FIG. 7 how the sample element 24 protrudes into the housing 32 of the second pack 14 or into the casing U2 of the second pack 14 by means of the bevelled corner 30. It can therefore be seen that pivoting of the sample elements 24 in the representation shown in FIG. 7 in the clockwise direction about the pivot axis A is prevented by the housing 16 of the first pack 12 or by a reinforcement 54 of the side wall 20 of the housing 16 of the first pack 12, and that pivoting of the sample elements 24 in the representation shown in FIG. 7 in the anticlockwise direction is prevented by the housing 32 of the second pack 14 and/or by the sample elements 40 of the second pack 14.

The housing 32 of the second pack 14 prevents the sample elements 40 of the second pack 14 from pivoting clockwise about the pivot axis B in the representation shown in FIG. 7, and anticlockwise pivoting is prevented by the side wall 20 of the housing 16 of the first pack 12.

As already mentioned above, the end faces of the sample elements 40 of the second pack 14 on the right in FIG. 7 are substantially flush with the right end of the housing 16 of the first pack 12 in order to achieve a closed external appearance. Alternatively, however, the end faces of the sample elements 40 on the right in FIG. 7 and the end faces of the sample elements 40 on the left in FIG. 7 could be offset inwards, so that the second pack 14 can be arranged both in the orientation shown in FIG. 7 and, in an orientation in which the pivot axis B of the sample elements 40 of the second pack 14 in the view of FIG. 7 is at the bottom right, can be connected to the first container 12 in a further basic position.

The invention claimed is:

1. A sample folder for clearly displaying a plurality of sample elements, comprising:

a first pack of sample elements, wherein at least some of the sample elements of the first pack are displaceable relative to other sample elements of the first pack, a second pack of sample elements, wherein at least some of the sample elements of the second pack are displaceable relative to other sample elements of the second pack, wherein the first pack and the second pack are designed as units which are separate from one another, wherein the first pack has a housing to which the second pack is removably connected in a basic position in such a way that the second pack is at least partially surrounded by the housing of the first pack and is releasably held thereby;

wherein the first pack is detachably connected to the second pack in a release position, in which the second pack is positioned differently relative to the first pack by comparison with the basic position in which the second pack is set up and arranged to allow displacement of the sample elements of the first pack relative to the housing of the first pack; and wherein the first pack is detachably connected to the second pack in a presentation position in which the second pack is oriented differently relative to the first pack compared to the basic position, and is oriented differently compared to the release position, in which the second pack is set up and arranged to allow a displacement of sample elements of the second pack relative to other sample elements of the second pack.

2. The sample folder according to claim 1, wherein each of the first pack and the second pack comprises at least one magnetic or magnetisable portion, wherein the first pack and the second pack releasably connected to one another via an interaction of a magnetic or magnetisable portion of the first pack with a magnetic or magnetisable portion of the second pack.

3. The sample folder according to claim 2, wherein the magnetic or magnetisable portions are designed and arranged in such a way that the interaction thereof secures the first pack relative to the second pack in all three translational degrees of freedom.

4. The sample folder according to claim 1, wherein in the basic position the second pack is accommodated substantially completely within a casing of the first pack.

5. The sample folder according to claim 1, wherein the housing of the first pack has a stop against which the second pack rests in the basic position.

6. The sample folder according to claim 5, wherein the stop is formed by a reinforcement of some portions.

7. The sample folder according to claim 1, wherein the sample elements of the first pack are arranged on at least one sample carrier, wherein the sample carrier is displaceable relative to the housing of the first pack.

8. The sample folder according to claim 7, wherein in the basic position the second pack is arranged in such a way that each sample element is displaceable relative to the housing of the first pack and/or each sample carrier protrudes into a casing of the second pack.

9. The sample folder according to claim 1, wherein the sample elements of the first pack and of the second pack are arranged on sample carriers and at least one of: the sample elements have different dimensions from one another or the sample carriers have different dimensions from one another.

10. The sample folder according to claim 1 wherein the sample elements of the first pack are arranged on at least one sample carrier, and wherein at least one of the sample elements and/or the at least one sample carrier has at least one rounded or bevelled corner.

11. The sample folder according to claim 1, wherein at least one of the first pack and the second pack is configured such that in the basic position the second pack is set up to prevent the sample elements of the first pack from being displaced out of a casing of the first pack.

12. The sample folder according to claim 1, wherein the release position and the presentation position differ by an orientation of the second pack relative to the first pack, but the second pack is positioned substantially the same relative to the first pack in the release position and the presentation position.

13. The sample folder according to claim 12, wherein in the basic position the second pack is set up and arranged such that displacement of the sample elements of the second pack relative to the housing of the first pack is prevented.

14. The sample folder according to claim 1, wherein in the basic position the second pack is set up and arranged such that displacement of the sample elements of the second pack relative to the housing of the first pack is prevented.

15. A sample folder for clearly displaying a plurality of sample elements, comprising:

a first pack of sample elements, wherein at least some of the sample elements of the first pack are displaceable relative to other sample elements of the first pack, a second pack of sample elements, wherein at least some of the sample elements of the second pack are displaceable relative to other sample elements of the second pack, wherein the first pack and the second pack are designed as units which are separate from one another, wherein the first pack has a housing to which the second pack is removably connected in a basic position in such a way that the second pack is at least partially surrounded by the housing of the first pack and is releasably held thereby;

wherein the first pack is detachably connected to the second pack in a release position, in which the second pack is positioned differently relative to the first pack by comparison with the basic position in which the second pack is set up and arranged to allow displacement of the sample elements of the first pack relative to the housing of the first pack; and wherein the first pack is detachably connected to the second pack in a presentation position, in which the release position and the presentation position differ by an orientation of the second pack relative to the first pack, but the second pack is positioned substantially the same relative to the first pack in the release position and the presentation position.

16. The sample folder according to claim 15, wherein in the basic position the second pack is set up and arranged such that displacement of the sample elements of the second pack relative to the housing of the first pack is prevented.

* * * * *